United States Patent
Wang et al.

(10) Patent No.: US 8,640,679 B2
(45) Date of Patent: Feb. 4, 2014

(54) METHOD OF MODEL-BASED MULTIVARIABLE CONTROL OF EGR AND BOOST FOR INTERNAL COMBUSTION ENGINES

(75) Inventors: Yue-Yun Wang, Troy, MI (US);
Ibrahim Haskara, Macomb, MI (US);
Donald Terry French, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 788 days.

(21) Appl. No.: 12/848,188

(22) Filed: Aug. 1, 2010

(65) Prior Publication Data

US 2012/0024270 A1 Feb. 2, 2012

(51) Int. Cl.
*F02B 47/08* (2006.01)
*F02M 25/07* (2006.01)

(52) U.S. Cl.
USPC ............ 123/568.21; 701/106; 701/108

(58) Field of Classification Search
USPC ............ 123/568.11, 568.16, 568.21, 568.22; 701/106, 108, 114, 115; 702/182, 183
See application file for complete search history.

(56) References Cited

U.S. PATENT DOCUMENTS

| | | | |
|---|---|---|---|
| 6,820,600 B1 * | 11/2004 | Sisken et al. ............ | 123/568.21 |
| 7,438,061 B2 | 10/2008 | Gangopadhyay et al. | |
| 7,840,287 B2 * | 11/2010 | Wojsznis et al. ............... | 700/38 |
| 8,060,340 B2 * | 11/2011 | Gao et al. ....................... | 702/182 |
| 2009/0143871 A1 * | 6/2009 | Gao et al. ........................ | 700/29 |
| 2010/0170244 A1 * | 7/2010 | Brooks et al. .................. | 60/602 |

FOREIGN PATENT DOCUMENTS

EP 1481295 B1 7/2008

OTHER PUBLICATIONS

U.S. Appl. No. 12/693,613, Kang et al.
U.S. Appl. No. 12/409,761, Wang et al.
Wei et al., Gain Scheduled H-Infinity Control for Air Path Systems of Diesel Engines Using LPV Techniques, IEEE Transactions on Control Systems Technology, vol. 15, No. 3, pp. 406-415, May 2007.
U.S. Appl. No. 12/982,994, Wang et al.

* cited by examiner

*Primary Examiner* — Stephen K Cronin
*Assistant Examiner* — Joseph Dallo

(57) ABSTRACT

A method to control an exhaust gas recirculation and a manifold air pressure in an engine includes utilizing a decoupling matrix within a multiple input and multiple output controller to determine an exhaust gas recirculation command and a manifold air pressure command, wherein the decoupling matrix is configured based upon a diagonally dominant model of the engine compensated by the determined exhaust gas recirculation command and the manifold air pressure command. The exhaust gas recirculation and manifold air pressure are controlled based upon the determined exhaust gas recirculation command and the determined manifold air pressure command.

15 Claims, 7 Drawing Sheets

METHOD OF MODEL-BASED MULTIVARIABLE CONTROL OF EGR AND BOOST FOR INTERNAL COMBUSTION ENGINES

TECHNICAL FIELD

This disclosure is related to control of internal combustion engines.

BACKGROUND

The statements in this section merely provide background information related to the present disclosure and may not constitute prior art.

Engine control includes methods to control parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes power from the operation of the engine, for example, as provided by an accessory belt, to drive a compressor providing boost air to the engine. Engine control methods control boost air in order to control the resulting combustion within the engine and the resulting output of the engine.

Exhaust gas recirculation (EGR) is another parameter that can be controlled by engine control methods. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available.

SUMMARY

A method to control an exhaust gas recirculation and a manifold air pressure in an engine includes utilizing a decoupling matrix within a multiple input and multiple output controller to determine an exhaust gas recirculation command and a manifold air pressure command, wherein the decoupling matrix is configured based upon a diagonally dominant model of the engine compensated by the determined exhaust gas recirculation command and the manifold air pressure command. The exhaust gas recirculation and manifold air pressure are controlled based upon the determined exhaust gas recirculation command and the determined manifold air pressure command.

BRIEF DESCRIPTION OF THE DRAWINGS

One or more embodiments will now be described, by way of example, with reference to the accompanying drawings, in which.

DETAILED DESCRIPTION

Figure 1:
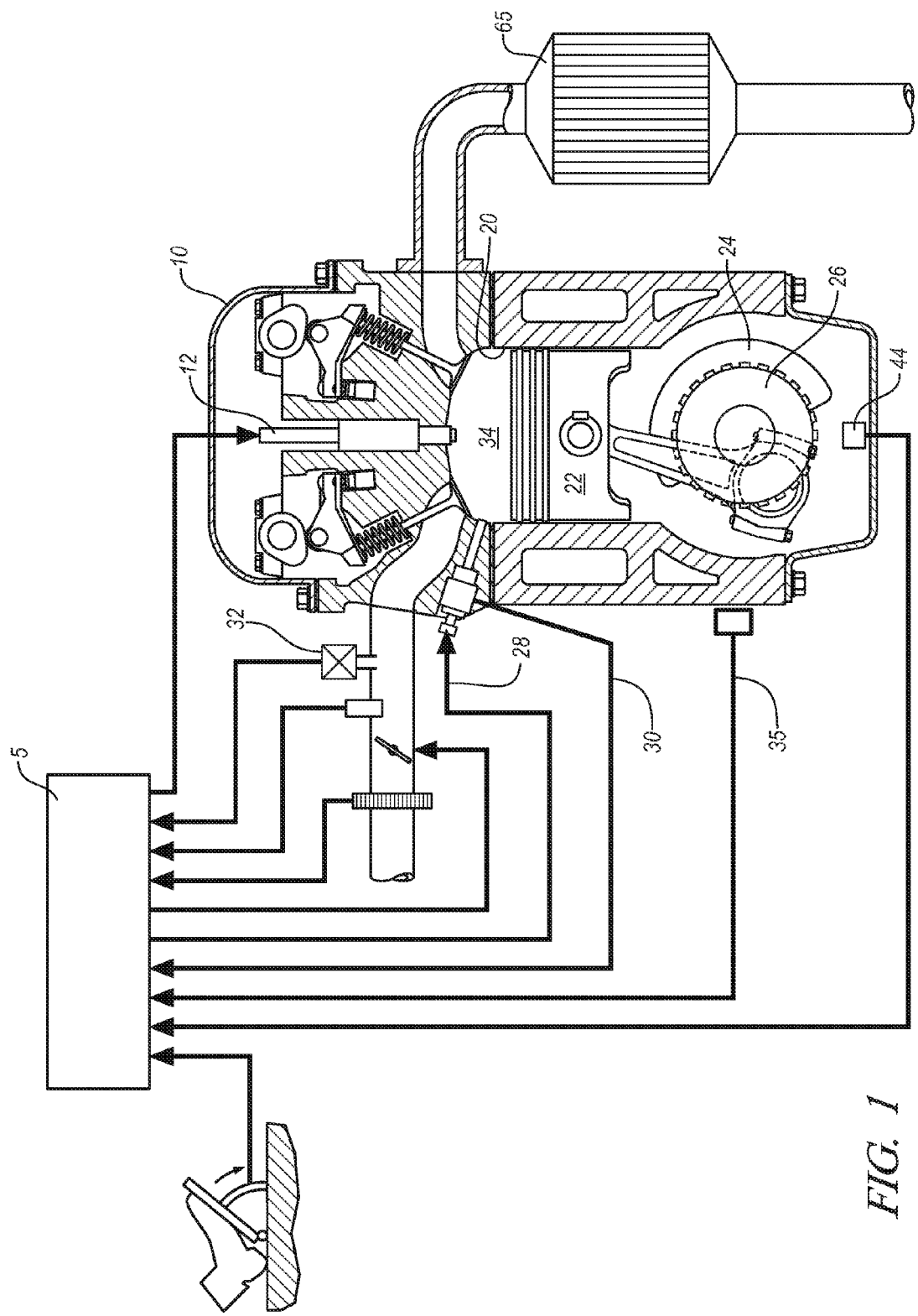
FIG. 1 schematically depicts an exemplary internal combustion engine, control module, and exhaust aftertreatment system, constructed in accordance with an embodiment of the disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, constructed in accordance with an embodiment of the disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and algorithms.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

FIG. 1 depicts an exemplary diesel engine, however, methods described herein can similarly be utilized on other engine configurations, for example, including gasoline-fueled engines, ethanol or E85 fueled engines, or other similar known designs. The disclosure is not intended to be limited to the particular exemplary embodiments described herein.

Figure 2:
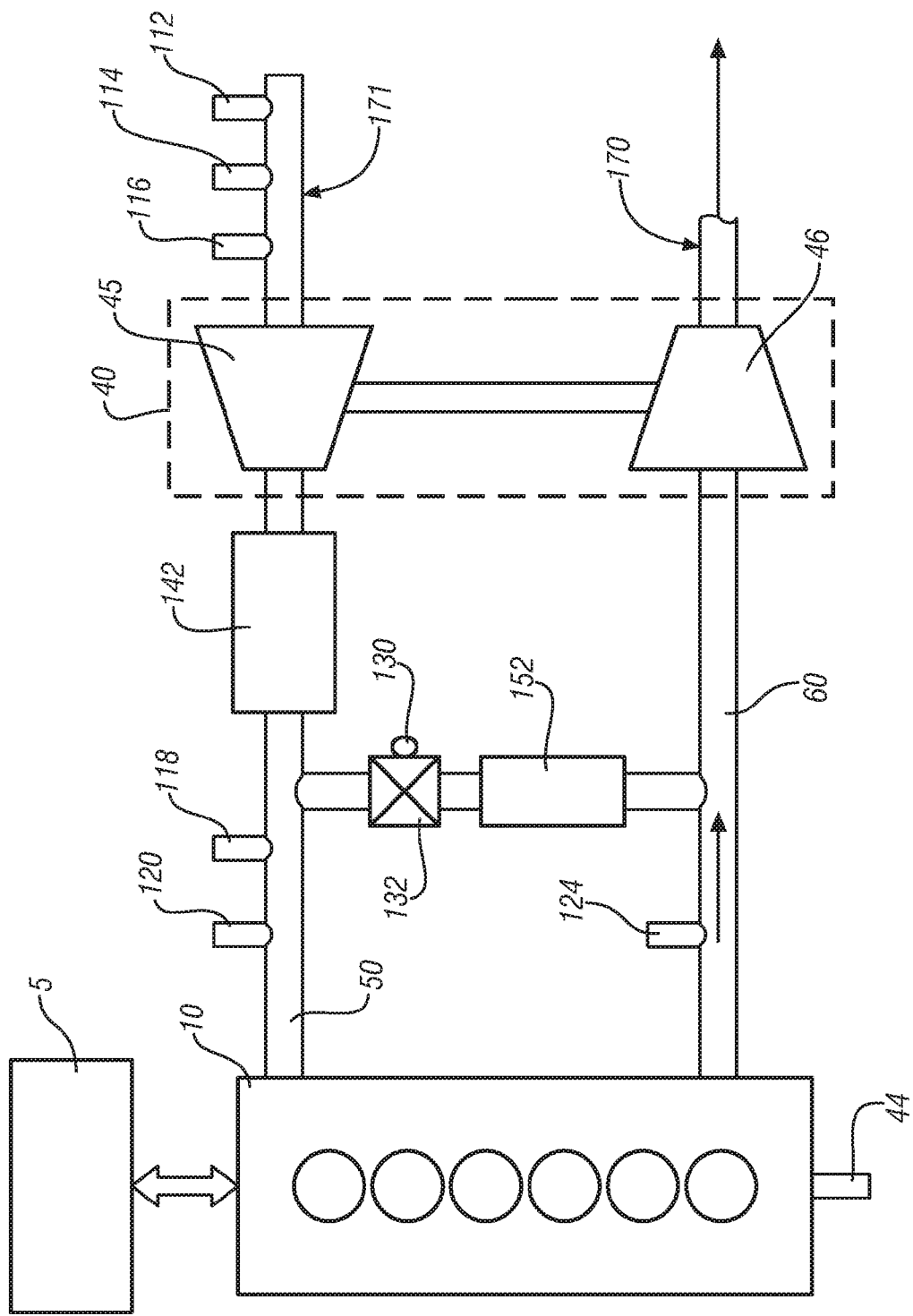
FIG. 2 schematically depicts an exemplary engine configuration including a turbocharger, in accordance with the present disclosure.

FIG. 2 schematically depicts an exemplary engine configuration including a turbocharger, in accordance with the present disclosure. The exemplary engine is multi-cylinder and includes a variety of fueling types and combustion strategies known in the art. Engine system components include an intake air compressor 40 including a turbine 46 and an air compressor 45, a charge air cooler 142, an EGR valve 132 and cooler 152, an intake manifold 50, and exhaust manifold 60. Ambient intake air is drawn into compressor 45 through intake 171. Pressurized intake air and EGR flow are delivered to intake manifold 50 for use in engine 10. Exhaust gas flow exits engine 10 through exhaust manifold 60, drives turbine 46, and exits through exhaust tube 170. The depicted EGR circuit is a high pressure EGR system, delivering pressurized exhaust gas from exhaust manifold 60 to intake manifold 50. An alternative configuration, a low pressure EGR system, can deliver low pressure exhaust gas from exhaust tube 170 to intake 171. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, an MAP sensor 120, an exhaust gas temperature sensor 124 and an EGR valve position sensor 130. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and algorithms and still fall within the scope of the disclosure. Furthermore, the intake air compressor 40 may include alternative turbocharger configurations within the scope of this disclosure.

The intake air compressor 40 includes a turbocharger consisting of an air compressor 45 positioned in the air intake of the engine which is driven by turbine 46 that is positioned in the exhaust gas flowstream. Turbochargers are known in the art to create forced induction of air into an engine, controlling boost pressure or controlling a manifold air pressure, to increase the output of the engine. Turbine 46 can include a number of embodiments, including a device with fixed vane orientations or variable vane orientations. Further, a turbocharger can be used as a single device, or multiple turbochargers can be used to supply boost air to the same engine.

Figure 3:
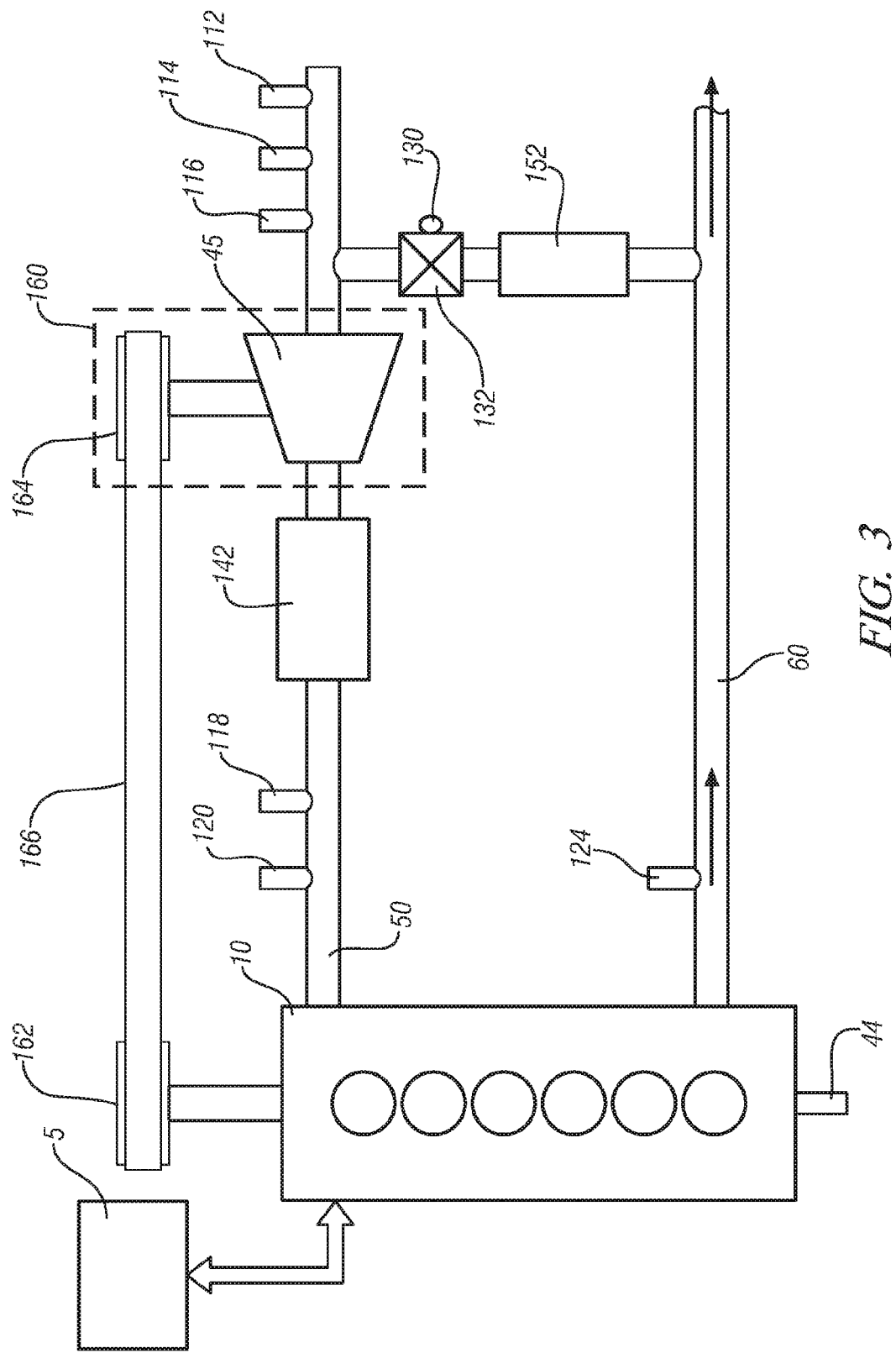
FIG. 3 schematically depicts an exemplary engine configuration including a supercharger, in accordance with the present disclosure.

FIG. 3 schematically depicts an exemplary engine configuration including a supercharger, in accordance with the present disclosure. The exemplary engine is multi-cylinder and includes a variety of fueling types and combustion strategies known in the art. Engine system components include a supercharger 160 comprising an air compressor 45 and a belt driven wheel 164, a charge air cooler 142, an EGR valve 132 and cooler 152, an intake manifold 50, and exhaust manifold 60. Engine 10 includes driven wheel 162, providing power to belt 166 driving belt driven wheel 164. An exemplary belt 166 can include a configuration known in the art as a serpentine belt. Exemplary configurations include belt 166 driving the supercharger 160 and other accessories such as an alternator or an air conditioning compressor simultaneously. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, MAP sensor 120, an exhaust gas temperature sensor 124 and an EGR valve position sensor 130. Exemplary EGR valve 130 and EGR cooler 152 provide a path for EGR flow to enter the intake system upstream of the supercharger 160. Under other configurations, the EGR flow can enter the intake system downstream of the supercharger 160, although it will be appreciated that high pressure downstream of the supercharger can limit conditions in which the EGR flow will effectively enter the intake under this configuration. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and algorithms and still fall within the scope of the disclosure. Supercharger 160 can be used to provide boost air to an engine, or supercharger 160 can be used in cooperation with a turbocharger to provide boost air to an engine.

Variable geometry turbochargers (VGT) enable control of how much compression is performed on intake air. A control signal can modulate operation of the VGT, for example, by modulating an angle of the vanes in the compressor and/or turbine. Such exemplary modulation can decrease the angle of such vanes, decreasing compression of the intake air, or increase the angle of such vanes, increasing compression of the intake air. VGT systems allow a control module to select a level of boost pressure delivered to the engine. Other methods of controlling a variable charger output, for example, including a waste gate or a bypass valve, can be implemented similarly to a VGT system, and the disclosure is not intended to be limited to the particular exemplary embodiments described herein for controlling boost pressure delivered to the engine.

Exemplary diesel engines are equipped with common rail fuel-injection systems, EGR systems, and VGT systems. Exhaust gas recirculation is used to controllably decrease combustion flaming temperature and reduce NOx emissions. VGT systems are utilized to modulate boost pressures to control a manifold air pressure and increase engine output. To accomplish engine control including control of the EGR and VGT systems, a multi-input multi-output air charging control module (MIMO module) can be utilized. A MIMO module enables computationally efficient and coordinated control of EGR and VGT based upon a single set of inputs describing desired engine operation. Such input, for example, can include an operating point for the engine describing an engine speed and an engine load. It will be appreciated that other parameters can be utilized as input, for example, including pressure measurements indicating an engine load.

An EGR valve modulates the amount of EGR, whereas a VGT modulates the compressor power to deliver desired boost pressure and maintain positive engine delta pressure for EGR flow. EGR and VGT control typically react predictably to a change in engine operating inputs. By controlling EGR and VGT through a MIMO controller as related variables based upon a common set of inputs, computationally efficient control methods can be utilized allowing real-time computation of the EGR and VGT control variables, for example, as real-time calculations to manage the charge flow mass flow to achieve desired power and torque targets. Coupled MIMO control of both EGR and VGT, or control fixing response of both EGR and VGT based upon any given input, is computationally efficient and can enable complex control responses to changing inputs that might not be computationally possible in real-time based upon independent control of EGR and VGT. However, coupled control of EGR and VGT, including fixed responses of both parameters for any given input, requires simplified or best fit calibrations of the coupled controls in order to control both fixed responses. As a result, such calibrations can be challenging and can include less than optimal engine performance based upon the simplified control calibrations selected. EGR and VGT, for example, might optimally react differently to a rate of change in load or to engine temperatures. Additionally, control of EGR or VGT can reach limit conditions and result in actuator saturation. Coupled control resulting in actuator saturation can cause a condition known in the art as wind-up wherein expected behavior of the system and desired control of the system diverge and result in control errors even after the actuator saturation has been resolved. Additionally, control of EGR and VGT by a MIMO module is nonlinear, and defining the coupled functional relationships to provide the desired control outputs requires extensive calibration work.

A method to control an engine including EGR and manifold air pressure control includes utilizing a decoupling matrix within a MIMO module, wherein the decoupling matrix is configured based upon a diagonally dominant compensated engine model.

Figure 4:
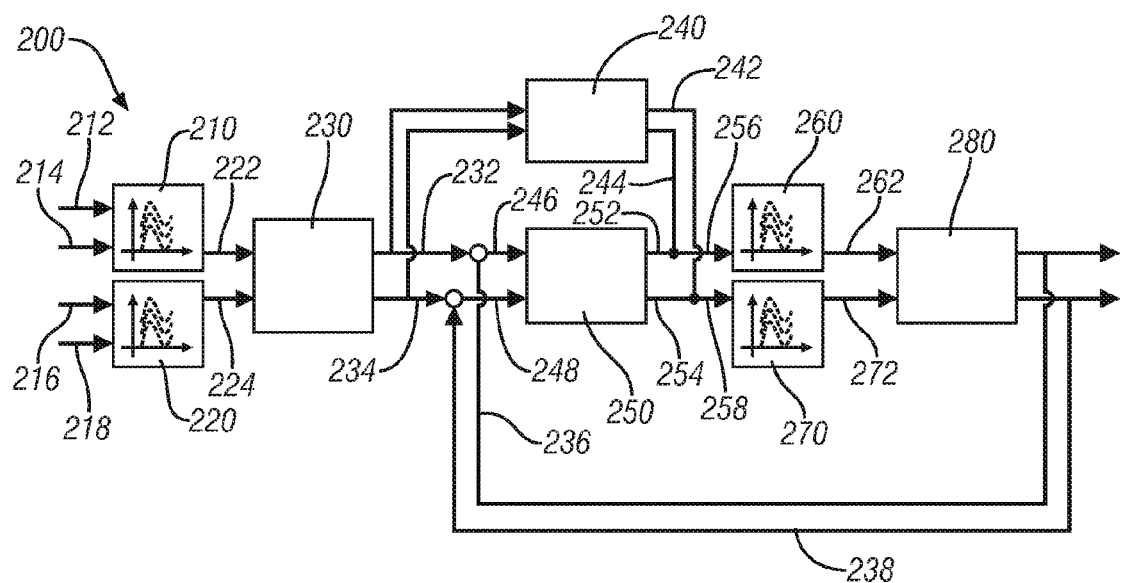
FIG. 4 schematically depicts an exemplary multivariable air-handling control system, including a MIMO module, providing boost air and EGR flow to an engine, in accordance with the present disclosure.

FIG. 4 schematically depicts an exemplary multivariable air-handling control system, including a MIMO module, providing boost air and EGR flow to an engine, in accordance with the present disclosure. An engine plant 280 is depicted receiving commands and producing outputs. A number of modules are depicted developing the commands, including EGR set point module 210, VGT set point module 220, pre-filter module 230, feed forward module 240, MIMO module 250, EGR actuator limit module 260, and VGT actuator limit module 270. EGR set point module 210 monitors inputs 212 and 214 describing an engine state. Inputs 212 and 214 can include an engine speed and an engine load or other parameters indicating similarly the state of the engine. For example, and engine fueling rate or pressure measurements useful to describe engine load can be utilized in place of an engine load. EGR set point module 210 outputs an uncorrected EGR set point command 222, for example, describing a calibrated or calculated EGR set point, for example, as can be stored in a look-up table, based upon the engine state. VGT set point module 220 monitors inputs 216 and 218 describing an engine state. Inputs 216 and 218 can be the same as inputs 212 and 214 but need not be the same parameters. VGT set point module 220 outputs an uncorrected VGT set point command 224, for example, describing a calibrated or calculated VGT set point, for example, as can be stored in a look-up table, based upon the engine state. Pre-filter module 230 applies methods known in the art to condition signals 222 and 224 to create a filtered uncorrected EGR set point command 232 and a filtered uncorrected VGT set point command 234. According to one exemplary embodiment, pre-filter module 230 can include a low pass filter applying a filter based upon $\omega_c/(\omega_c+s)$, wherein $\omega_c$ is a filter cut off frequency and s is a frequency operator. In an alternative embodiment, separate pre-filters could be applied to the separate signals. Feed forward module 240 inputs commands 232 and 234 and generates feed forward EGR command 242 and feed forward VGT command 244. In an exemplary control system, the feed forward commands 242 and 244 developed by feed forward module 240 are essentially an inverse of the plant dynamics, which generates default actuator positions from the control set points, usually scheduled by engine speed and load as shown in FIG. 4. Feedback signals describing an actual EGR position or a resulting EGR rate 236 and an actual VGT position or a resulting boost pressure 238 are compared to respective commands 232 and 234, and an EGR error term 246 and a VGT error term 248 are determined EGR error term 246 and VGT error term 248 are used as inputs to MIMO module 250, embodied as a MIMO feedback controller, and methods described herein are utilized to develop MIMO EGR command 252 and MIMO VGT command 254. Commands 252 and 254 are combined with respective commands 242 and 244 to generate corrected EGR command 256 and corrected VGT command 258. As described above, actuators controlling EGR and VGT can include limits. EGR actuator limit module 260 conditions corrected EGR command 256 based upon actuator limits to generate an EGR position command 262. Similarly, VGT actuator limit module 270 conditions corrected VGT command 258 based upon actuator limits to generate a VGT position command 272. The two inputs to the engine plant 280 include the EGR position command 262 and the VGT position command 272. Both a resulting EGR rate 236 and the resulting boost pressure 238 are depicted outputs of engine plant 280.

The above describes VGT commands as a method to control boost pressure. However, other commands controlling a boost pressure such as a boost pressure command or a manifold air pressure command can be utilized similarly in place of VGT commands.

Methods described herein include a MIMO module 250, such that a closed-loop control system is utilized meeting stability and performance requirements with robust margins against engine uncertainties and nonlinearities. A method can be employed within MIMO module 250 including control achieving a level of decoupling between the EGR loop and the boost pressure loop while retaining computational efficiency enabled by use of MIMO module control. By decoupling control of the EGR and the VGT, the system exhibits resistance to disturbances created by coupled control of the EGR and the VGT and exhibits improved tracking capability between a desired output and a measured output of the engine. Additionally, decoupled control of the EGR and VGT enables individual tuning to each of the particular control functions and associated gains, thereby simplifying calibration.

Exemplary selection of functions and associated gains to achieve decoupled control of EGR and VGT is based upon a set of linear models identified from a nonlinear engine plant at selected operating points. Such a process is known as system identification. In one exemplary method to select the functions and associate gains, superposed sinusoid signals or pseudo random binary signals can be used as persistent excitation to the plant for system identification. To determine the frequency range for persistent excitation, the power spectrums of the command signals are analyzed for the boost pressure and the EGR rate commands during a EPA defined FTP-75 transient emission test. From both spectrums, 96% of energy is found to be concentrated within the 0.5 Hertz frequency band. Since the responses of the air system are required to track the set point commands, the frequency range of the system identification should be at least five times larger than 0.5 Hertz ($\pi$ rad/s), and possibly extend beyond the system cut-off frequency:

$$\omega = (0\omega_H), \omega_H > \max(5*\pi, \omega_{Cut\ off}) \quad [1]$$

A linearized state space system for the air handling system of a diesel engine is identified by methods known in the art. In an exemplary method utilizing mean-value physical models of an air handling system derived by applying the conservation of mass and energy, the air path dynamics can be described effectively by a fifth order nonlinear system as follows:

$$\frac{dm_{im}}{dt} = \dot{m}_a + \dot{m}_{egr} - \dot{m}_o \quad [2]$$

$$\frac{dP_{im}}{dt} = \frac{R}{c_{v_{im}} V_{im}}[\dot{m}_a T_a c_{P_{im}} + \dot{m}_{egr} T_{egr} c_{P_{egr}} - \dot{m}_o T_{im} c_{P_{im}}] \quad [3]$$

$$\frac{dm_{em}}{dt} = \dot{m}_{ex} - \dot{m}_{egr} - \dot{m}_t \quad [4]$$

$$\frac{dP_{em}}{dt} = \frac{R_e}{c_{v_{em}} V_{em}}[\dot{m}_{ex} T_{ex} c_{P_{ex}} - (\dot{m}_{egr} + \dot{m}_t) T_{em} c_{P_{em}}] \quad [5]$$

$$J_t \frac{dN_t}{dt} = \frac{\eta_m c_{P_{ex}} \dot{m}_t (T_{em} - T_{tot}) - \dot{m}_{air} c_{pair}(T_{cot} - T_{amb})}{N_t} \quad [6]$$

where the five states are:
$m_{im}$, the air mass of the intake volume,
$m_{em}$, the exhaust mass in the exhaust manifold,
$P_{im}$, the boost (intake manifold) pressure,
$P_{em}$, the exhaust manifold pressure, and
$N_t$, the turbo speed.

The other parameters in Equations 2-6 represent mass flows through different volumes, temperatures, and specific heat coefficients. By neglecting the mass balance equations for the intake and exhaust volumes, the model can be further reduced to a third order differential equation with the boost pressure, the exhaust pressure, and the turbo speed as the state variables. This observation indicates that one can select a third, a fifth, or higher order model structure for the identified linear system.

As an example, a linear model is identified from a 4.9 L diesel engine for the following operating point: engine speed equals 2000 rpm, engine load equals 374 ft-lb, EGR valve position equals 7% open (first control input), VGT position equals 70% close (second control input). Superposed sinusoid signals are applied to perturb the EGR valve and VGT vane position. The magnitudes of the excitation signals are chosen as ±10% around the set point values for the EGR and VGT valve positions. The system model, through system identification, is identified as fifth order multivariable linear system in the following discrete-time form:

$$x_{k+1} = Ax_k + Bu_k \quad [6]$$

$$y_k = Cx_k \quad [7]$$

$$u = [u_1 u_2]' \quad [8]$$

$$y = [y_1 y_2]' \quad [9]$$

where the EGR and VGT positions are the inputs and the EGR rate and the boost pressure are the outputs:

$$u_1 = u_{EGR}, u_2 = u_{VGT}, y_1 = EGR \%, y_2 = P_{im} \quad [10]$$

Figure 5:
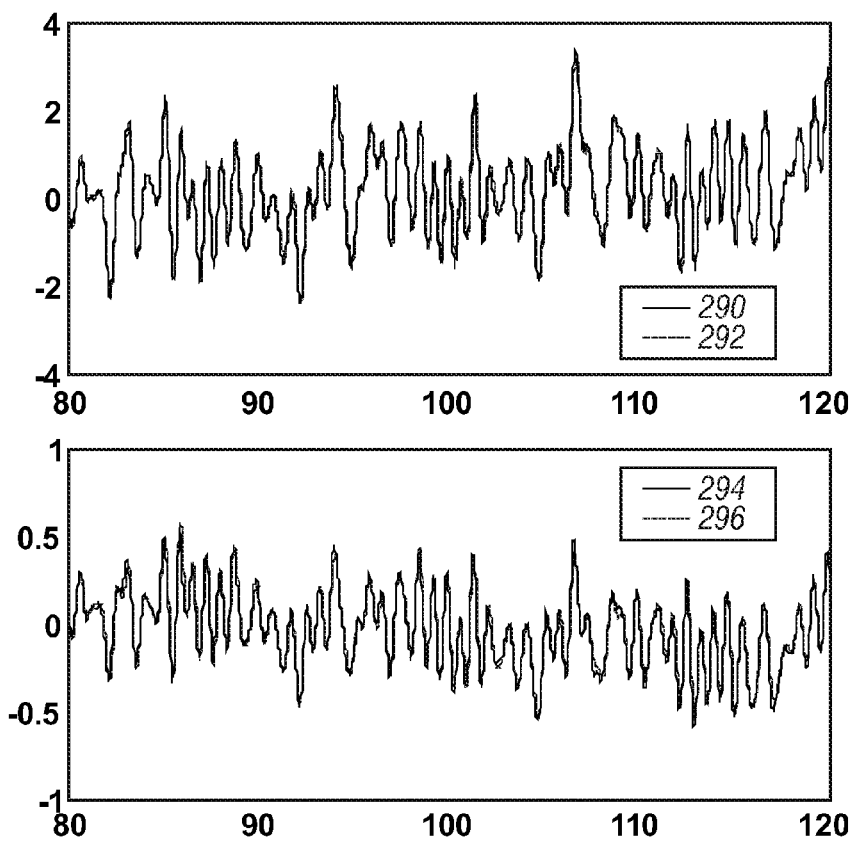
FIG. 5 graphically depicts a measured output and a simulated output compared for the purpose of validating the simulated model, in accordance with the present disclosure.

The identified model is then validated and its time responses can be compared against the excitation signals. FIG. 5 graphically depicts a measured output and a simulated output compared for the purpose of validating the simulated model, in accordance with the present disclosure. The x-axes of both graphs describe a time of a test in seconds. The y-axis of the top graph describes a perturbation in an EGR rate. The y-axis of the bottom graph describes a perturbation in the boost pressure. Plots 290 and 294 represent the perturbed outputs of the boost pressure and EGR rate, respectively. Plots 292 and 296 represent the corresponding model outputs of Equations 6-9. The results depicted in FIG. 5 reveal that the exemplary model is approximately 90% accurate.

Figure 6:
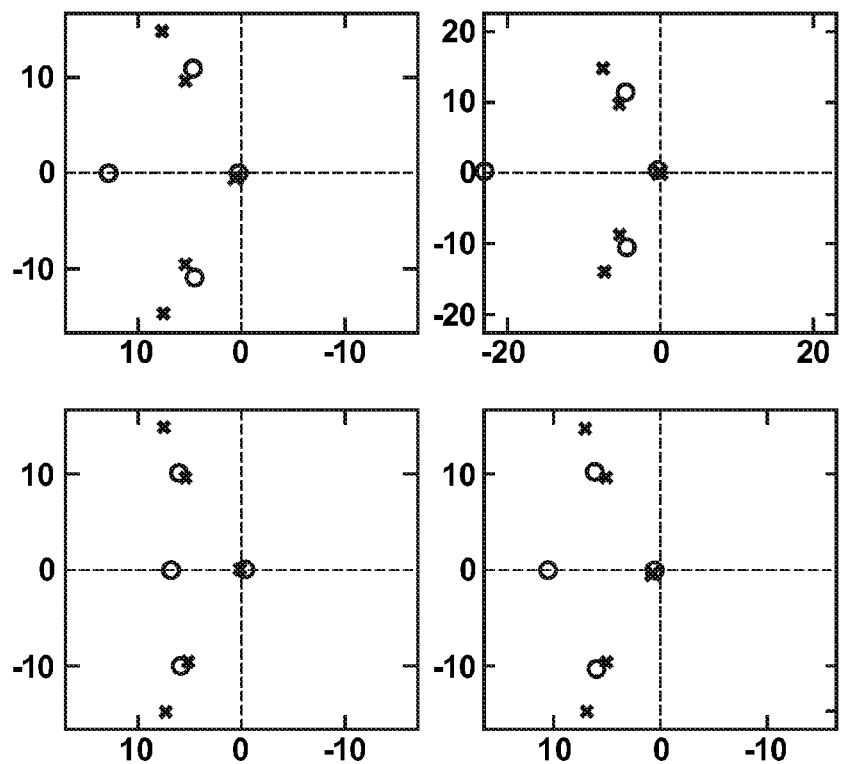
FIG. 6 depicts pole-zero locations of the exemplary linear model shown in the continuous frequency domain, in accordance with the present disclosure.

FIG. 6 depicts pole-zero locations of the exemplary linear model shown in the continuous frequency domain, in accordance with the present disclosure. Defining the transfer functions G11, G12, G21, and G22 as individual elements for this system, the following equations can be expressed.

$$y_1 = G_{11} u_1 + G_{12} u_2 \quad [11]$$

$$y_2 = G_{21} u_1 + G_{21} u_2 \quad [12]$$

Since the transfer functions share the same poles, their transmission zeros determine the differences among these subsystems. In each sub-plot of FIG. 6, three zeros are almost canceled by three poles at those locations. Therefore, the remaining fourth zero indicates how strong a control input will have influence on the outputs. For example, the fourth zero of $G_{12}$ is located at −23 on the real axis, which is the furthest away from the imaginary axis relative to the other zeros in the other subsystems $G_{11}$, $G_{21}$, and $G_{22}$. This means that the VGT input not only affects the boost pressure but also affects the EGR rate substantially at this operating point. By comparing the distances of the fourth zeros in $G_{21}$ and $G_{22}$ to the imaginary axis, we see that the EGR valve input has less coupling effect on the boost pressure. This means that VGT is the main leverage to modulate both boost pressure and EGR rate. Further, the system described by Equations 6-9 is a non-minimum phase system, where there is a zero on the right half s-plane for $G_{12}$ as shown in FIG. 6.

The methods described herein decouple the EGR rate from the boost pressure control for a multivariable system, as described by Equations 6-9. A compensated engine plant $P(s,\rho)$, corrected or compensated by application of a decoupling matrix, can be defined by the following equation:

$$P(s,\rho) = G(s,\rho) \cdot W(s,\rho) \quad [13]$$

wherein $G(s,\rho)$ is an original open-loop system or the unmodified engine plant gain, and $W(s,\rho)$ is a weighting matrix or decoupling matrix generating the modeled system, $P(s,\rho)$.

$W(s,\rho)$ is designed such that $P(s,\rho)$ is diagonally dominant, yielding the following expression.

$$P(s,\rho) \approx \begin{bmatrix} P_{11}(s) & 0(\varepsilon) \\ 0(\varepsilon) & P_{22}(s) \end{bmatrix} \quad [14]$$

One exemplary method to make P diagonally dominant is to configure W based upon the inverse of G. In one embodiment, the decoupling matrix, W, can be described by the following equation:

$$W(s, \rho) = \begin{bmatrix} W_{11}(s, \omega, Pr_c, Pr_t, \Delta P) & W_{12}(s, \omega, Pr_c, Pr_t, \Delta P) \\ W_{21}(s, \omega, Pr_c, Pr_t, \Delta P) & W_{22}(s, \omega, Pr_c, Pr_t, \Delta P) \end{bmatrix} \quad [15]$$

wherein $\omega$ describes an engine speed,
$Pr_c$ is a turbocharger compressor pressure ratio,
$Pr_t$ is a turbocharger turbine pressure ratio, and
$\Delta P$ is an engine delta pressure defined as an exhaust pressure divided by an intake manifold pressure.

Figure 7:
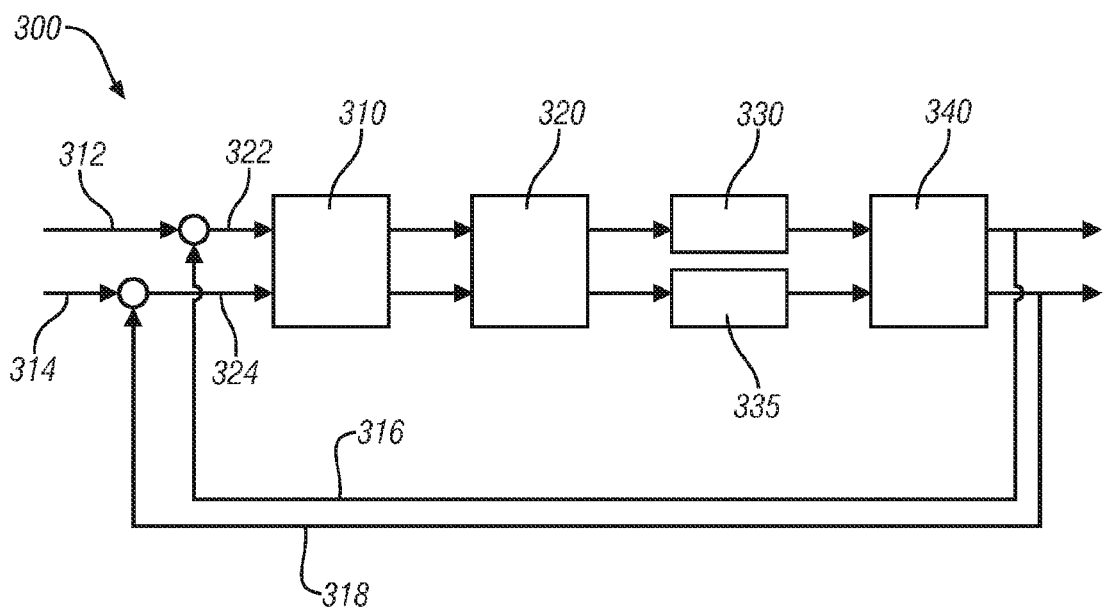
FIG. 7 schematically depicts operation of an exemplary diagonal MIMO feedback controller utilizing a decoupling matrix, in accordance with the present disclosure.

The decoupling matrix, W, can be utilized within a MIMO feedback controller as described in the exemplary embodiment of FIG. 4. FIG. 7 schematically depicts operation of an exemplary diagonal MIMO feedback controller utilizing a decoupling matrix, in accordance with the present disclosure. Configuration 300 includes a feedback controller 310, a decoupling module 320, actuator saturation modules 330 and 335, and an engine plant 340. Inputs to configuration 300 include an uncorrected EGR set point command 312 and an uncorrected manifold air pressure (MAP) set point command 314. Commands 312 and 314 are combined, respectively, with feedback signals describing a resulting EGR rate 316 and a resulting MAP 318 to generate an EGR error term 322 and a MAP error term 324. Feedback controller 310 can include exemplary PID control and inputs EGR error term 322 and MAP error term 324. In one embodiment, feedback controller 310 can include diagonal controllers described by the following expression.

$$\begin{bmatrix} c_1(s) & 0 \\ 0 & c_2(s) \end{bmatrix} \quad [16]$$

Feedback controller 310 generates feedback control outputs of both EGR and boost pressure based upon the application of $c_1(s)$ and $c_2(s)$. Decoupling module 320 receives the outputs of feedback controller and applies $W(s,\rho)$, as described above, to generate corrected decoupled control signals. Actuator saturation modules 330 and 335 each compare over time the respective input control signal or command generated with actuator and system limits and applies anti-windup corrections to the corrected decoupled control signals. Engine plant 340 can be represented by $G(s,\rho)$, and outputs of engine plant 340 can be monitored, measured, estimated, or predicted. Feedback signals can be modeled as described by the following equation:

$$\text{feedback } c_i(s, \rho) = \left( K_{pi}(\rho) + \frac{K_{Ii}(\rho)}{s} + D_i(\rho)s \right) \left( \frac{\omega_c}{s + \omega_c} \right) \Bigg|_{i=1,2} \quad [17]$$

wherein $K_{pi}$ is a proportional gain and can be referenced as a tabulated value, and
$K_{Ii}$ is an integration gain and can also be referenced as a tabulated value.

Figure 8:
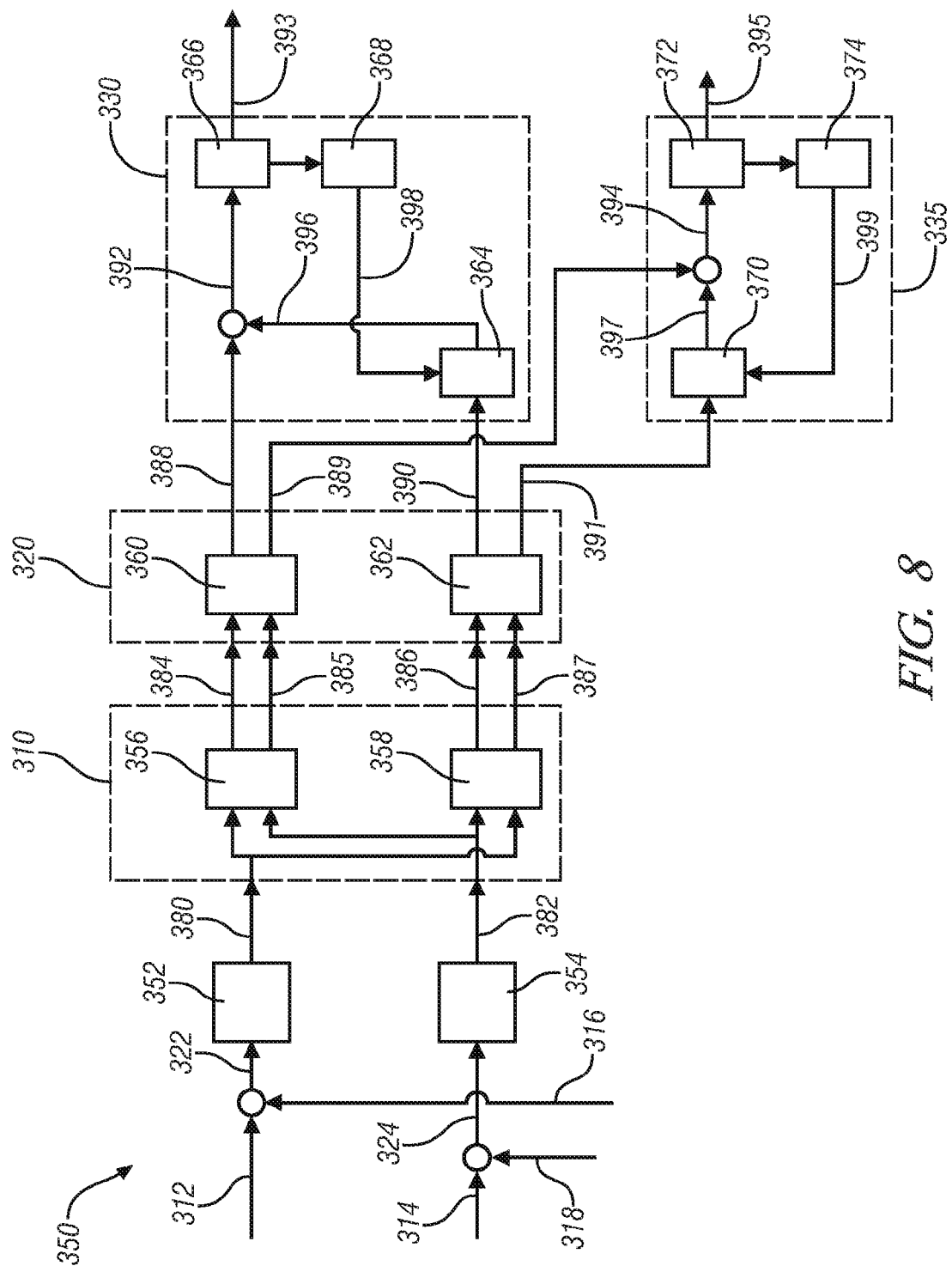
FIG. 8 schematically depicts operation of an exemplary diagonal MIMO feedback controller utilizing a decoupling matrix in greater detail, in accordance with the present disclosure.

FIG. 8 schematically depicts operation of an exemplary diagonal MIMO feedback controller utilizing a decoupling matrix in greater detail, in accordance with the present disclosure. Configuration 350 is depicted including a feedback controller 310, a decoupling module 320, and actuator saturation modules 330 and 335. Inputs to configuration 300 include an uncorrected EGR set point command 312 and an uncorrected MAP set point command 314. Commands 312 and 314 are combined, respectively, with feedback signals describing a resulting EGR rate 316 and a resulting MAP 318 to generate an EGR error term 322 and a MAP error term 324. Exemplary low pass filters 352 and 354 are utilized to filter terms 322 and 324, respectively, creating a filtered EGR error term 380 and a filtered MAP error term 382. Terms 380 and 382 are inputs to feedback controller 310. Within feedback controller 310, the exemplary configuration 350 includes a P gain controller matrix 356, describing the proportional controllers $c_1$ and $c_2$ as described in relation to FIG. 7 and Equation 16, and an I gain controller matrix 358, describing the integral controllers $c_1$ and $c_2$ as described in relation to FIG. 7 and Equation 16. Both P gain controller matrix 356 and I gain controller matrix 358 input both terms 380 and 382. An exemplary P gain controller matrix 356 can be described by the following expression.

$$\begin{bmatrix} K_{p1} & 0 \\ 0 & K_{p2} \end{bmatrix} \quad [18]$$

$K_{p1}$ and $K_{p2}$ can be described by the following equation:

$$K_{p1,2} = f_p(\omega, P_{im}) \quad [19]$$

wherein $P_{im}$ describes the MAP. Similarly, an exemplary I gain controller matrix 358 can be described by the following expression.

$$\begin{bmatrix} K_{I1} & 0 \\ 0 & K_{I2} \end{bmatrix} \quad [20]$$

$K_{I1}$ and $K_{I2}$ can be described by the following equation.

$$K_{I1,2} = f_I(\omega, P_{im}) \quad [21]$$

Feedback controller 310 outputs from P gain controller matrix 356 an uncorrected P gain EGR component 384 and an uncorrected P gain MAP component 385. Feedback controller 310 also outputs from 1 gain controller matrix 358 an uncorrected I gain EGR component 386 and an uncorrected I gain MAP component 387. Decoupling module 320 includes modules 360 and 362, each positioned to decouple a pair of components 384 and 385 and components 386 and 387, respectively, with the decoupling matrix, W. Decoupling module 320 outputs a corrected P gain EGR component 388, a corrected P gain MAP component 389, a corrected I gain EGR component 390, and a corrected I gain MAP component 391.

Tracking operation of actuators over time can take a number of embodiments. In one exemplary embodiment, an integration or integrator module can be used to track values of the actuator through a period. Control methods can then take into account the operation of the actuator through the time period. Exemplary embodiments of a MIMO module are known to utilize an integrator upon inputs entering the MIMO module. However, based upon the methods describe herein, operation of the decoupling matrix upon the control signals output from the MIMO module can alter actual operation of the actuators controlled by the outputs of the MIMO module as compared to any integration based upon inputs to the MIMO module. As a result, integration of actuator operation or control of the system described herein can be improved by integrating the operation or control based upon the outputs of the MIMO module.

Actuator saturation module 330 includes monitored inputs of corrected P gain EGR component 388 and a corrected I gain EGR component 390. Actuator saturation module 330 includes a correcting integration module 364, integrating corrected I gain EGR component 390; an actuator saturation limit module 366, evaluating at or near limit conditions of the controlled EGR actuator; and an anti-windup integration module 368, providing a correction signal 398 to correcting integration module 364. Actuator saturation module 335 is similarly depicted including monitored inputs of corrected P gain MAP component 389 and a corrected I gain MAP component 391. Actuator saturation module 335 includes a correcting integration module 370, integrating corrected I gain MAP component 391; an actuator saturation limit module 372, evaluating at or near limit conditions of the controlled MAP actuator; and an anti-windup integration module 374, providing a correction signal 399 to correcting integration module 370.

As described above, control of EGR and VGT systems include the control of actuators controlling charge air flow through the intake to the engine. Operation of these actuators at or near limits of the actuators can result in deviation between the desired portions of the charge air flow and actual portions of the charge air flow. Actuator saturation modules 330 and 335 monitor the operation of the EGR and VGT actuators at or near their limits and selectively integrate the monitored commands based upon whether the actuator commands are likely to result in actual changes to the charge air flow. For example, if an actuator is monitored at a positive limit and a positive change in the actuator command is detected, then the actuator saturation module will not record or integrate that positive change in the actuator command. Similarly, if an actuator is monitored at a negative limit and a negative change in the actuator command is detected, then the actuator saturation module will not record or integrate that negative change in the actuator command.

Correcting integration modules 364 and 370 integrate respective corrected I gain EGR component 390 and a corrected I gain MAP component 391 signals, recording accumulated values of the component I gain signals through a time period. Correcting integration modules 364 and 370 include in the integration anti-windup correction signals 398 and 399, respectively, from anti-windup integration modules 368 and 374, respectively. As described above, by integrating the signals based upon the outputs of the MIMO module, modules 364 and 370 avoid inaccuracies that would result from utilizing integrations based upon inputs to the MIMO module. Correcting integration module 364 outputs an integrated corrected I gain EGR component 396. Corrected P gain EGR component 388 and integrated corrected I gain EGR component 396 are summed to create a summed unevaluated EGR command 392. Command 392 is evaluated by actuator saturation limit module 366. If the actuator is not at or near the limit or no correction for actuator limits is required, command 392 becomes an EGR command 393 for output to the engine and/or respective actuator. EGR command 393 can be transformed, for example, into an EGR position command 262, as describing in FIG. 4. If a correction for actuator limits is required, command 392 is utilized to generate anti-windup correction signal 398 through anti-windup integration module 368. Similarly, correcting integration module 370 outputs an integrated corrected I gain MAP component 397. Corrected P gain MAP component 389 and integrated corrected I gain MAP component 397 are summed to create a summed unevaluated MAP command 394. Command 394 is evaluated by actuator saturation limit module 372. If the actuator is not at or near the limit or no correction for actuator limits is required, command 394 becomes a MAP command 395 for output to the engine and/or respective actuator. MAP command 395 can be transformed, for example, into a VGT position command 272, as describing in FIG. 4. If a correction for actuator limits is required, command 394 is utilized to generate anti-windup correction signal 399 through anti-windup integration module 374.

Real-time calculation of parameters to operate an engine can be optimized for simplified computations. At low frequencies, defined by values of frequency operator, s, Equations 13-15 can be simplified. Recalling the definition of Equation 13, the decoupling matrix at low frequencies can be expressed by the following equations:

$$W = inv(DCgain) * \text{diag}(\alpha_1, \alpha_2) \quad [22]$$

$$DCgain = G(s)|_{s=0} = -CA^{-1}B \quad [23]$$

$$W = \begin{bmatrix} 1 & w_{12}(Pr, \omega) \\ w_{21}(Pr, \omega) & 1 \end{bmatrix} \quad [24]$$

$$Pr = \frac{P_{im}}{P_{am}} \quad [25]$$

wherein DCgain is a static gain matrix describing G(s),
 $\omega$ is the engine speed,
 Pr is a boost ratio,
 $P_{im}$ is the boost pressure, and
 $P_{am}$ is the ambient pressure.

Figure 9:
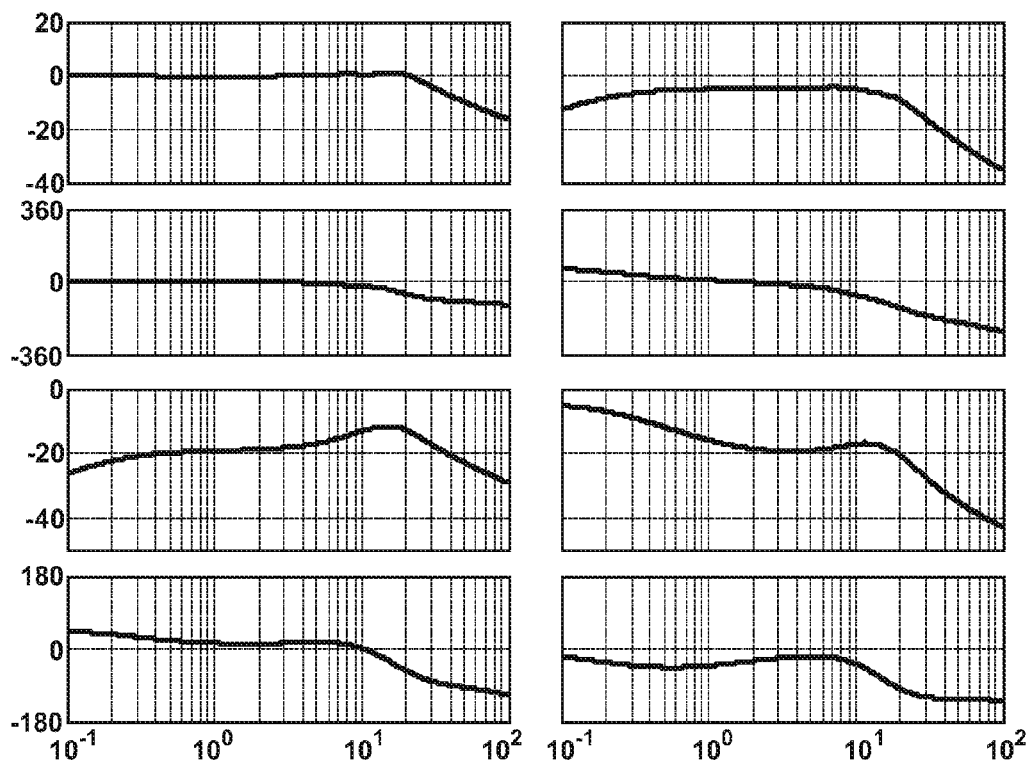
FIG. 9 graphically depicts exemplary frequency responses of an engine plant model utilizing a decoupling matrix, in accordance with the present disclosure.

FIG. 9 graphically depicts exemplary frequency responses of an engine plant model utilizing a decoupling matrix, in accordance with the present disclosure. FIG. 9 is a Bode diagram of the decoupled system at low frequencies. Dividing the graphs into quadrants describing pairs of plots, the top plot in the left column and the plot below it describe an EGR fraction response to changes in EGR valve position, the top describing a magnitude response and the bottom describing a phase response. The bottom two plots in the left column describe a boost pressure response to changes in EGR valve position, the top describing a magnitude response and the bottom describing a phase response. The top plot in the right column and the plot below it describe an EGR fraction response to changes in VGT position, the top describing a magnitude response and the bottom describing a phase response. The bottom two plots in the right column describe a boost pressure response to changes in VGT position, the top describing a magnitude response and the bottom describing a phase response. It can be seen from FIG. 9 that the VGT input now mainly affects the boost pressure with minimal effect on the EGR rate. Similarly, the EGR valve input has a dominant effect on the EGR rate, with a minimal effect on the boost pressure. The compensated system becomes diagonally dominant at the low frequency ranges of interest.

Figure 10:
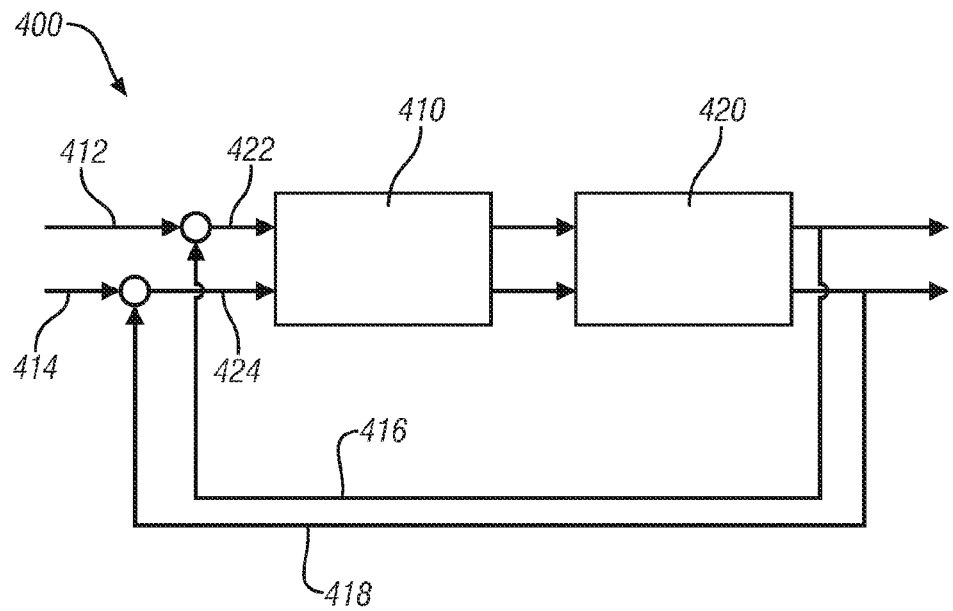
FIG. 10 schematically depicts an exemplary diagonal controller that can be utilized to implement a compensated engine plant model utilizing a decoupling matrix at low frequencies, in accordance with the present disclosure.

Based on the compensated system, quantitative feedback design for EGR and VGT control can be implemented. FIG. 10 schematically depicts an exemplary diagonal controller that can be utilized to implement a compensated engine plant model utilizing W(s) at low frequencies, in accordance with the present disclosure. An exemplary diagonal controller can be structured in the form of FIG. 10, which renders the dynamics of the closed-loop control system as follows.

$$G_{CL}(s) = (I + P(s)C(s))^{-1}P(s)C(s) \quad [26]$$

The design of feedback control is then performed by a MIMO loop shaping in terms of a quantitative feedback theory (QFT) design framework. Specifically, the loop transmissions of this MIMO system for the first and second control loops or channels are denoted $L_1(s)$, $L_2(s)$ as follows.

$$L_1(s) = p_{11}c_1 - p_{12}c_2(1+p_{22}c_2)^{-1}p_{21}c_1 \quad [27]$$

$$L_2(s) = p_{22}c_2 - p_{12}c_2(1+p_{11}c_1)^{-1}p_{21}c_1 \quad [28]$$

Exemplary MIMO loop shaping can be performed through the following steps. First, assuming that $c_2(s)$ is a high gain controller such that $$L_1(s) \approx (p_{11} - p_{12}p_{22}^{-1}p_{21})c_1 = \tilde{P}_{11}c_1 \quad [29]$$

then $c_1(s)$ is designed such that it stabilizes the simplified sensitivity function of the first control channel denoted by $s_{11}$, while satisfying the loop-shaping criterion $$|s_{11}| = \left|\frac{1}{1+\tilde{p}_{11}c_1}\right| \leq \tilde{m}_1(\omega) \leq m_1(\omega), \omega \in [\omega_L \omega_H] \quad [30]$$

for the given sensitivity bounds $\tilde{m}_1(\omega)$ and $m_1(\omega)$. The frequency-based bound $\tilde{m}_1(\omega) \leq m_1(\omega)$ is used for overdesign as a part of a sequential design since $L_1(s)$ is approximated at this step.

As a second step, for a given $c_i(s)$ from the first step design, the sensitivity function of the second control channel becomes $$s_{22} = \frac{1}{1+L_2(s)} \quad [31]$$

$$= \frac{1}{1+(p_{22}-p_{12}(1+p_{11}c_1)^{-1}p_{21}c_1)c_2}$$

$$= \frac{1}{1+\tilde{p}_{22}c_2}$$

where $c_2(s)$ is designed for $\tilde{p}_{22}$, which stabilizes the sensitivity function $s_{22}$, while the following inequalities are also satisfied:

$$|s_{22}| = \left|\frac{1}{1+L_2(s)}\right| \leq m_2(\omega) \quad [32]$$

$$|s_{11}| = \left|\frac{1}{1+L_1(s)}\right| \quad [33]$$

$$= \left|\frac{1}{1+(p_{11}-p_{12}c_2(1+p_{22}c_2)^{-1}p_{21})c_1}\right| \leq m_1(\omega)$$

where the bounds for the sensitivity functions are selected to achieve desired tracking and disturbance attenuation for the specified plant. Gain margin (GM) and phase margin (PM) are the effective measures of system robustness. PM is also related to overshoot and system response time. As described in Equation 20, by setting $$m(\omega) = \frac{1}{\sin(PM)} \quad [34]$$

the sensitivity function is bounded by $$\left|\frac{1}{1+kp_0(j\omega)c(\omega)}\right| \leq \frac{1}{\sin(PM)}, \text{ for all } k \in [k_1, k_2] \text{ and} \quad [35]$$

$$\omega \geq 0$$

so that the closed-loop system has guaranteed lower and upper gain margins of $k_2[1-\sin(PM)]^{-1}$ and $[1+\sin(PM)]/k_1$. Similar conclusion holds true for a complementary sensitivity function, such that $$\left|\frac{p_0(j\omega)c(\omega)}{1+kp_0(j\omega)c(\omega)}\right| \leq \frac{1}{\sin(PM)}, \text{ for all } k \in [k_1, k_2] \text{ and} \quad [36]$$

$$\omega \geq 0$$

For a MIMO control system, $PM_1$ and $PM_2$ are defined as the phase margins for the loop transmissions $L_1(s)$ and $L_2(s)$ in the first and the second control channels, respectively. Similarly, the gain margins are defined as $GM_1$ and $GM_2$. Based on the relations of Equations 34-36, the QFD bounds are determined in terms of the desired loop transmission gain and phase margins to shape the sensitivity transfer functions $s_{11}$ and $s_{22}$.

For simplicity, one can implement the controllers of $c_1(s)$ and $c_2(s)$ in the form of a PI type control with an additional low pass filtering as follows.

$$c_i(s) = \left(K_{pi} + \frac{K_{Ii}}{s}\right)\left(\frac{\omega_{ci}}{s+\omega_{ci}}\right)\bigg|_{i=1,2} \quad [37]$$

One exemplary method to derive QFD bounds for the proportional gain, $K_p$, and the integral gain, $K_I$, and for the cut-off frequency $\omega_c$ from the QFD bounds of the sensitivity functions $s_{11}$ and $s_{22}$. A family of controller $c_1(s)$ and $c_2(s)$ were then computed, such that the inequalities of Equations 32 and 33 are satisfied. Among these controllers, one can choose an optimal solution to further balance the tradeoff between boost pressure and EGR rate responses.

A method described above to control an EGR system and a VGT in an engine can be summarized to include identifying a plurality of operating points throughout an operating range of the engine defined by engine speed and engine load, determining a decoupling matrix for the engine through system identification, determining for each operating point a multiple input multiple output control scheme controlling the exhaust gas recirculation system and the variable geometry turbocharger based upon the decoupling matrix and the uncompensated model of the engine, and utilizing the multiple input multiple output control scheme for each operating point to control the engine. Determining the decoupling matrix for the engine includes, at each operating point, monitoring an engine speed, monitoring a boost ratio, identifying a static gain describing an uncompensated model of the engine, and identifying a data point for the decoupling matrix based upon an inverse of the uncompensated model of the engine. Utilizing the multiple input multiple output control scheme for each operating point to control the engine can be accomplished, for example, by interpolating commands between the operating points.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control an exhaust gas recirculation and a manifold air pressure in an engine, the method comprising:
monitoring parameters describing a desired engine state;
determining an uncorrected exhaust gas recirculation command and an uncorrected manifold air pressure command based on the monitored parameters;
utilizing a feed forward module to generate a feed forward exhaust gas recirculation command and a feed forward manifold air pressure command based upon the uncorrected exhaust gas recirculation command and the uncorrected manifold air pressure command;
determining an exhaust gas recirculation error term from a comparison of the uncorrected exhaust gas recirculation command and an exhaust gas recirculation feedback term;
determining a manifold air pressure error term from a comparison of the uncorrected manifold air pressure command with a manifold air pressure feedback term;
utilizing a decoupling matrix within a multiple input and multiple output (MIMO) controller to determine a MIMO exhaust gas recirculation command and a MIMO manifold air pressure command, said decoupling matrix configured based upon a diagonally dominant model of the engine compensated by the exhaust gas recirculation error term and the manifold air pressure error term;
generating an exhaust gas recirculation command based on combining the MIMO exhaust gas recirculation command with the feed forward exhaust gas recirculation command, wherein the feed forward exhaust gas recirculation command bypasses the MIMO controller;
generating a manifold air pressure command based upon combining the MIMO manifold air pressure command with the feed forward manifold air pressure command, wherein the feed forward manifold air pressure command bypasses the MIMO controller;
controlling the exhaust gas recirculation and the manifold air pressure based upon the determined exhaust gas recirculation command and the determined manifold air pressure command.

2. The method of claim 1, wherein the decoupling matrix configured based upon the diagonally dominant model of the engine is configured based upon an inverse of an uncompensated model of the engine.

3. The method of claim 1, further comprising:
evaluating actuator saturation of an actuator controlling the exhaust gas recirculation;
evaluating actuator saturation of an actuator controlling the manifold air pressure;
modifying the exhaust gas recirculation command based upon the evaluated actuator saturation of the actuator controlling the exhaust gas recirculation; and
modifying the manifold air pressure command based upon the evaluated actuator saturation of the actuator controlling the manifold air pressure.

4. The method of claim 3, wherein modifying the exhaust gas recirculation command comprises utilizing an integration based upon an output of the decoupling matrix.

5. The method of claim 3, wherein modifying the manifold air pressure command comprises utilizing an integration based upon an output of the decoupling matrix.

6. Method to control an air handling system for an engine comprising an exhaust gas recirculation system controllably delivering exhaust gas recirculation to the engine and a charging device controllably affecting a manifold air pressure, the method comprising:
monitoring uncorrected parameters describing a desired engine state;
determining a feed forward exhaust gas recirculation command based upon the uncorrected monitored parameters;
determining a feed forward manifold air pressure command based upon the uncorrected monitored parameters;
within a multiple input and multiple output (MIMO) controller, determining a MIMO exhaust gas recirculation command based upon the monitored uncorrected parameters and a decoupling matrix;
within the MIMO controller, determining a MIMO manifold air pressure command based upon the monitored uncorrected parameters and the decoupling matrix;
comparing the MIMO exhaust gas recirculation command with the feed forward exhaust gas circulation command to determine a corrected exhaust gas recirculation command;
comparing the MIMO manifold air pressure command with the feed forward manifold air pressure command to determine a corrected manifold air pressure command;
controlling the air handling system based upon the corrected exhaust gas recirculation and the manifold air pressure commands;
wherein the decoupling matrix is configured based upon a diagonally dominant model of the engine compensated by the determined exhaust gas recirculation command and the manifold air pressure command.

7. The method of claim 6, further comprising:
monitoring actuator limits for an actuator controlling the delivery of the exhaust gas recirculation;
monitoring actuator limits for an actuator controllably affecting the manifold air pressure;
wherein determining the corrected exhaust gas recirculation command is further based upon the monitored actuator limits for the actuator controlling the delivery of the exhaust gas recirculation; and
wherein determining the corrected manifold air pressure command is further based upon the monitored actuator limits for the actuator controllably affecting the manifold air pressure.

8. The method of claim 7, wherein determining the corrected exhaust gas recirculation command based upon the monitored actuator limits for the actuator controlling the delivery of the exhaust gas recirculation comprises applying a first anti-windup integration; and
wherein determining the corrected manifold air pressure command based upon the monitored actuator limits for the actuator controllably affecting the manifold air pressure comprises applying a second anti-windup integration.

9. The method of claim 6, further comprising:
monitoring a compressor pressure ratio;
monitoring a turbine pressure ratio; and
monitoring an engine delta pressure;
wherein the decoupling matrix is a function of the compressor pressure ratio, the turbine pressure ratio, and the engine delta pressure.

10. The method of claim 6, further comprising:
operating the engine at a low frequency;
monitoring an engine speed; and
monitoring a boost ratio;
wherein the decoupling matrix is a function of the engine speed and the boost ratio.

11. The method of claim 6, further comprising:
monitoring an exhaust gas recirculation feedback term; and
monitoring a manifold air pressure feedback term;
wherein determining the corrected exhaust gas recirculation command is further based upon the exhaust gas recirculation feedback term and the manifold air pressure feedback term; and
wherein determining the corrected manifold air pressure command is further based upon the exhaust gas recirculation feedback term and the manifold air pressure feedback term.

12. The method of claim 6, further comprising:
determining an uncorrected exhaust gas recirculation command based upon the monitored uncorrected parameters;
determining an uncorrected manifold air pressure command based upon the monitored uncorrected parameters;
monitoring an exhaust gas recirculation feedback term;
monitoring a manifold air pressure feedback term;
determining an error between the uncorrected exhaust gas recirculation command and the exhaust gas recirculation feedback term; and
determining an error between the uncorrected manifold air pressure command and the manifold air pressure feedback term;
wherein determining the MIMO exhaust gas recirculation command based upon the monitored parameters comprises determining the MIMO exhaust gas recirculation command based upon the error between the uncorrected exhaust gas recirculation command and the exhaust gas recirculation feedback term and the error between the uncorrected manifold air pressure command and the manifold air pressure feedback term; and
wherein determining the MIMO manifold air pressure command based upon the monitored parameters comprises determining the manifold air pressure command based upon the error between the uncorrected exhaust gas recirculation command and the exhaust gas recirculation feedback term and the error between the uncorrected manifold air pressure command and the manifold air pressure feedback term.

13. The method of claim 12, further comprising:
applying a low pass filter to the error between the uncorrected exhaust gas recirculation command and the exhaust gas recirculation feedback term; and
applying a low pass filter to the error between the uncorrected manifold air pressure command and the manifold air pressure feedback term.

14. Method to control exhaust gas recirculation system and a variable geometry turbocharger in an engine, the method comprising:
determining a decoupling matrix for the engine through system identification, comprising:
identifying a plurality of operating points throughout an operating range of the engine defined by engine speed and engine load;
at each operating point, monitoring an engine speed;
at each operating point, monitoring a boost ratio;
at each operating point, identifying a static gain describing an uncompensated model of the engine;
at each operating point, identifying a data point for the decoupling matrix based upon an inverse of the uncompensated model of the engine;
for each operating point, determining a feed forward exhaust gas recirculation command based upon uncorrected monitored parameters describing a desired engine state;
for each operating point, determining a feed forward manifold air pressure command based upon the uncorrected monitored parameters describing the desired engine state;
within a multiple input and multiple output (MIMO) controller, determining a MIMO exhaust gas recirculation command based upon the monitored uncorrected parameters and a decoupling matrix;
within the MIMO controller, determining a MIMO manifold air pressure command based upon the monitored uncorrected parameters and the decoupling matrix;
comparing the MIMO exhaust gas recirculation command with the feed forward exhaust gas circulation command to determine a corrected exhaust gas recirculation command;
comparing the MIMO manifold air pressure command with the feed forward manifold air pressure command to determine a corrected manifold air pressure command; and
controlling the exhaust gas recirculation system and variable geometry turbocharger based upon the corrected exhaust gas recirculation and the manifold air pressure commands.

15. The method of claim 14, wherein utilizing the MIMO control scheme for each operating point to control the engine comprises interpolating commands between the operating points.

* * * * *